United States Patent [19]

Ono et al.

[11] 4,092,969
[45] June 6, 1978

[54] GASOLINE ENGINE FED WITH LEAN MIXTURE ONLY

[75] Inventors: Junichi Ono; Akira Shimoura, both of Toyonaka; Yukiyasu Tanaka, Okazaki, all of Japan

[73] Assignee: Daihatsu Kogyo Kabushiki Kaisha, Ikeda, Japan

[21] Appl. No.: 680,085

[22] Filed: Apr. 26, 1976

[30] Foreign Application Priority Data

Aug. 16, 1975  Japan .................................. 50-99720

[51] Int. Cl.² ........................... F02B 3/00; F02B 23/00
[52] U.S. Cl. ............................... 123/191 S; 123/32 L; 123/32 SP; 123/191 M; 123/193 H
[58] Field of Search ................. 123/30 C, 30 D, 32 R, 123/32 C, 32 D, 32 K, 32 L, 32 SP, 32 ST, 191 R, 191 M, 191 S, 191 SP, 193 R, 193 H

[56] References Cited

U.S. PATENT DOCUMENTS

| 1,579,625 | 4/1926 | Banghart | 313/143 |
| 2,292,409 | 8/1942 | Steward | 123/32 C |
| 2,314,175 | 3/1943 | Summers | 123/33 D |
| 2,725,865 | 12/1955 | McDuffie | 123/191 M |
| 2,737,170 | 3/1956 | McDuffie | 123/191 M |
| 3,092,088 | 6/1963 | Goossak | 123/191 SP |
| 3,766,900 | 10/1973 | Aiti | 123/191 M |
| 3,830,205 | 8/1974 | Date et al. | 123/32 ST |
| 3,974,818 | 8/1976 | Noguchi | 123/32 ST |

FOREIGN PATENT DOCUMENTS

| 640,734 | 7/1950 | United Kingdom | 123/191 M |
| 911,125 | 11/1962 | United Kingdom | 123/32 SP |
| 930,498 | 7/1963 | United Kingdom | 123/32 B |

*Primary Examiner*—Charles J. Myhre
*Assistant Examiner*—William Randolph
*Attorney, Agent, or Firm*—Burns, Doane, Swecker & Mathis

[57] ABSTRACT

A gasoline engine fed with lean mixture only is improved for practical use. The cylinder head of the engine has an area providing intense turbulence in cooperation with the top surface of the piston. It is provided, further, with a torch chamber which emits torch flames sharing the combustion of lean mixture so that the flame propagation distance is decreased. Among the torch flame, one passes through a portion of the combustion chamber just below the center of the head of the suction valve, and another passes through a portion of the combustion chamber just below the center of the head of the exhaust valve.

9 Claims, 17 Drawing Figures

GASOLINE ENGINE FED WITH LEAN MIXTURE ONLY

This invention relates to the internal combustion engine art, and is concerned with improvements to gasoline engines fed with lean mixture only.

The fuel feeding system of gasoline engines for automobiles had been made to feed mixture of air-fuel ratio (which will be referred to merely as A/F hereinafter) of 11 to 15. However, since the pollution of atmosphere due to hydrocarbon, carbon monoxide and nitrogen oxide contained in the exhaust gas has come to cause serious troubles, there are being developed engines adapted to be fed lean mixture which contains so much excess air as to suppress the emission of the above noxious materials.

Currently, engines of a type in which a lean mixture is ignited by a torch flame made by using a relatively rich mixture have come to be practiced, and they have the following advantages:

1. By using rich mixture, it is easy to provide a mixture for generating a torch flame which is surely ignitable by a spark plug;
2. The energy level of the torch flame is sufficiently high; and
3. The durability of the torch flame is high. However, in the case of these engines, it is necessary to provide a fuel feeding system of rich mixture in addition to a fuel feeding system of lean mixture. And the sacrifices for the provision of such a fuel feeding system of dual type are very large as to structure, maintainance and economy.

Therefore, development of engines of a type wherein the lean mixture is fed also for the generation of the torch flame has been attempted. This type of engine can be styled "single fuel feeding system type". The problem on this type of engine are how a dependable ignition by a spark plug is realized, and how the propagation of flame is developed in the combustion chamber so as to obtain high performance under conditions to keep the exhaust gas clean.

A principal object of the present invention is to overcome the above problems; also to provide an engine of high performance which can be operated by feeding it lean mixture only.

Other objects and advantages will be apparent from the following description, taken in connection with the accompanying drawings, in which.

Figure 13:
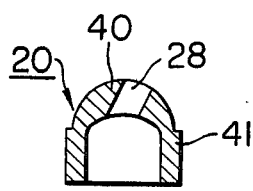
Figure 14:
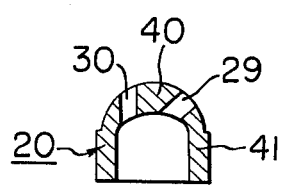
Figure 15:
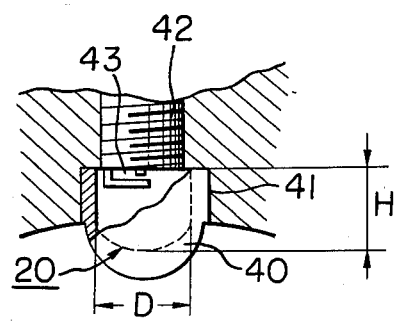
Figure 16:
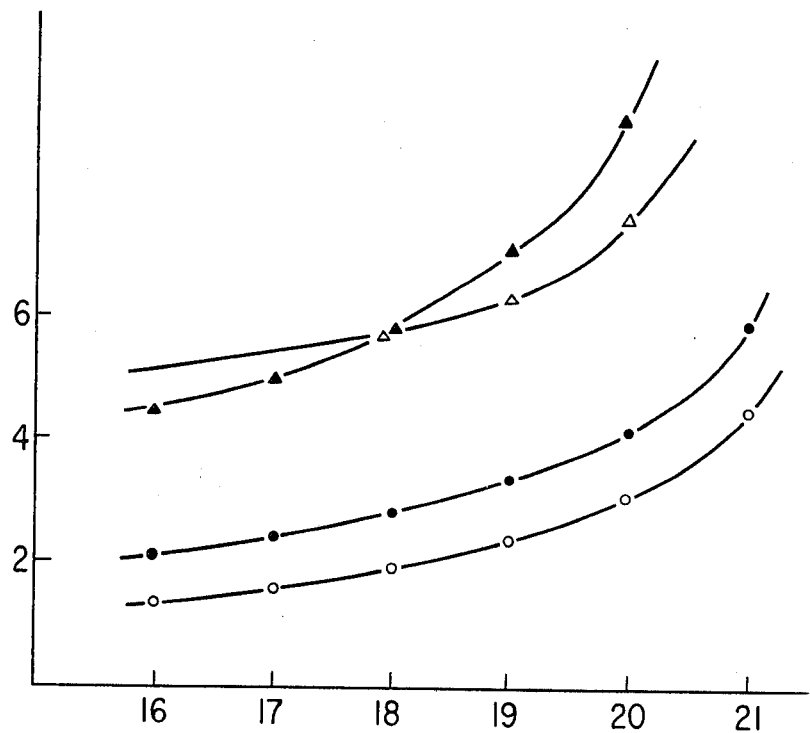
Figure 17:
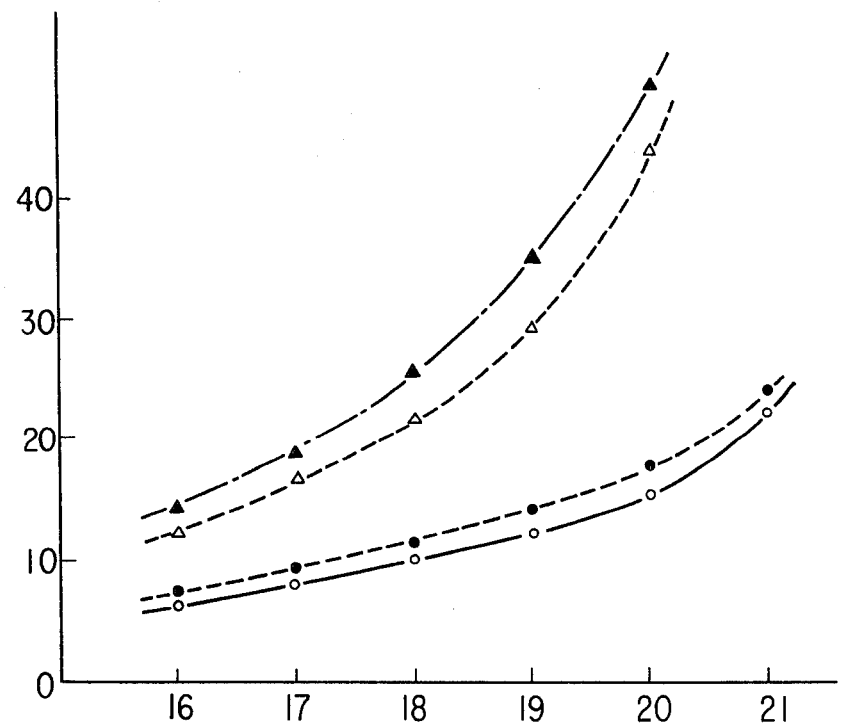

FIGS. 13 and 14 are sectional views taken in the direction of line 13—13 and 14—14, respectively;

FIG. 15 is a sectional view showing the auxiliary combustion chamber together with the cylinder head;

FIG. 16 is a diagram showing a relation between the rate of hydrocarbon emission in the exhaust gas and the air-fuel ratio; and FIG. 17 is a diagram showing a relation between the rate of load fluctuation and the air-fuel ratio.

Figure 1:
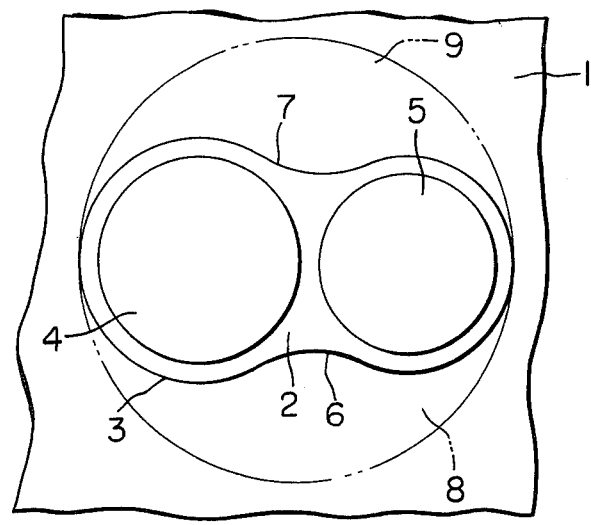
FIG. 1 is a bottom view showing a cylinder head of an ordinary engine for which lean mixture is not fed.

Referring now to FIG. 1, there is shown a cylinder head 1 of a conventional engine which is fed with a mixture of A/F ratio of from 11 to 15. In this figure, a combustion chamber recess 2 with a peripheral profile 3, a suction valve 4 and an exhaust valve 5 are shown together with a cylinder bore. The cylinder bore is shown by a chain (broken) line. First of all, the shape of the combustion chamber recess should be noticed. The profile 3 is restricted and has entering parts 6, 7 between the suction valve 4 and the exhaust valve 5. Such entering parts 6, 7 are provided so as to meet a requirement for obtaining a desired compression ratio. Recently, there is a tendency of eliminating one of the engine parts 6, 7 by another requirement of making small the ratio of area to volume.

The combustion chamber formed between the cylinder head and the top surface of the piston has flat zones 8, 9 causing strong squishing (turbulance) actions at the end of the compression stroke due to the entering parts 6, 7. The form of the cylinder head 1 providing the zones 8, 9 divides the combustion chamber into the following two parts which are remarkably different from each other in the rate of volume change as far as they are concerned wth a range of crank angle from $Q_1$, at which the combustion of mixture begins to $Q_2$, at which the combustion of mixture is substantially terminated.

First part

The part of volume V between the combustion chamber recess 2 in the cylinder head 1 and the top surface of the piston opposed to it.

Second part

The part of volume v between the flat zones 8, 9 (which will be referred as squishing areas hereinafter) in the cylinder head and the top surface of the piston opposed to them.

The volume v of the second part will be only 0.05V or less even at the above crank angle $Q_2$. The first part can be considered to be further divided into two parts. The one is the part of the volume $V_1$ most of which opposes to the suction valve, and the other is the part of volume $V_2$ most of which opposes to the exhaust valve.

Figure 2:
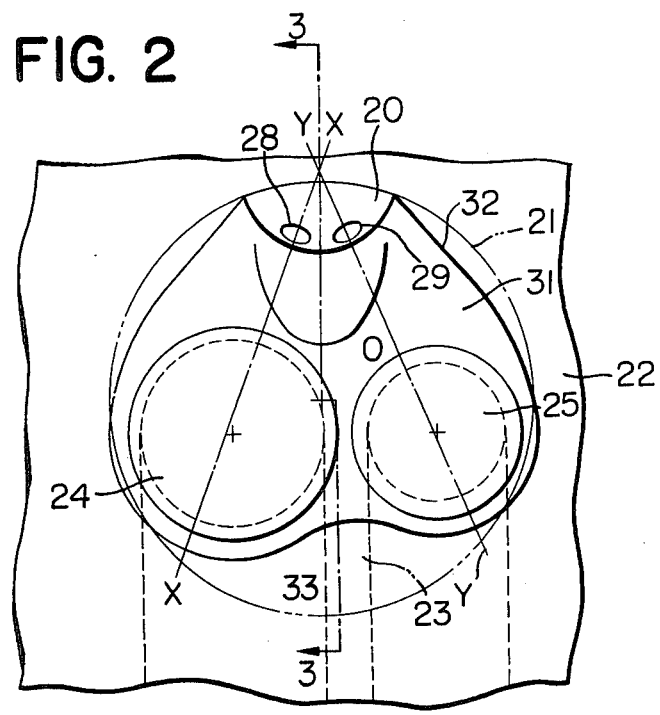
FIG. 2 is a bottom view showing a cylinder head of an engine according to the present invention.

The engine according to the present invention, with such consideration as is mentioned above for background, is provided with an auxiliary combustion chamber 20 for generating torch flames as shown in FIG. 2. Hereinafter, this chamber will be called a "torch chamber". The torch chamber 20 is set in a position deviated from the center line 0 of the cylinder bore 21, and further, it is provided with a plurality of openings for blowing out (emitting) torch flames under definite conditions which will be explained later.

Figure 7:
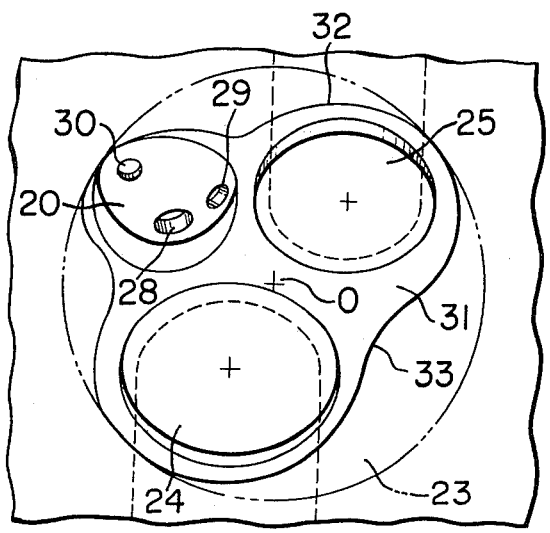
FIG. 7 is a bottom view of the cylinder head shown in FIGS. 5 and 6.

In the case of the cylinder head 22 shown in FIG. 2, owing to the inclusion of the torch chamber 20, a fairly large amount of one of the squishing areas 9, shown in FIG. 1 has been lost, but the other squishing area 8 shown in FIG. 1 is left as it is and is designated by a numeral 23. Part 24 is a suction valve and 2 is an exhaust valve. The part corresponding to the part of volume $V_1$ and the part corresponding to the part of volume $V_2$ which are pointed out in the case of the conventional engine will be called as the first part $S_1$ of the combustion chamber and the second part $S_2$ of the combustion chamber, respectively. The first part $S_1$ mostly opposes to the suction valve 24 and the second part $S_2$ opposes mostly to the exhaust valve 25. Further, the part corresponding to the part of volume v which relates to the turbulance area will be called the third part s of the combustion chamber (see FIG. 5). The torch chamber 20 is provided with an opening 28 which emits a torch flame in a direction within a plane X—X, and also an opening 29 which emits a torch flame in a direction within a plane Y—Y. These planes X—X and Y—Y are parallel with the center line 0 of the cylinder bore. The torch flames emitted from the openings 28, 29 will hereinafter be called "first touch" and "second torch", respectively. The flow of gas due to the first torch passes through the first part $S_1$ of the combustion chamber, and the flow of gas due to the second torch passes through the second part $S_2$. The plane X—X is one which passes through the part $S_1$ of the combustion chamber under a nearly maximum span. On the other hand, the plane Y—Y is one which passes through the part $S_2$ of the combuston chamber under a nearly maximum span. As shown in FIGS. 2 and 7, the distance between the center of the head of suction valve 24 and the plane X—X is small. Similarly, the distance between the center of the head of exhaust valve 25 and the plane Y—Y is small. In other words, the plane X—X is near to the center of the head of the inlet valve 24, and the plane Y—Y is near to the center of the head of the exhaust valve 25.

Figure 4:
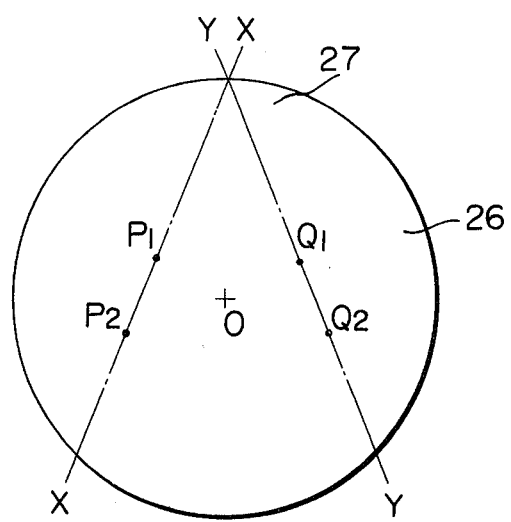
FIG. 4 is a view explaining a relation between the piston and the directions of torch flames of the engine according to the present invention.

The flows of gas due to the torches blow against the small areas of the top surface 27 of the piston 26. These areas vary with the movement of the piston 26. In FIG. 4, points $P_1$, $P_2$ show the centers of area on the side of the first torch, and points $Q_1$, $Q_2$ show centers of area on the side of the second torch. The combustion of the lean mixture terminates nearly at a crank angle of 30° after the top dead center. The points $Q_1$, $Q_2$ are those which correspond to the above crank angle after the top dead center.

The first torch and the second torch take their share for the combustion of lean mixture in the part $S_1$ and part $S_2$ by their directions selected as explained above. And, by this sharing, the flame in the combustion chamber becomes propagated in such manner as to reach any and all points in the combustion chamber without having to pass long distances. The reduction of the distance of the flame propagation effectively acts to increase the thermal efficiency of the engine, and this is the first advantage brought about by the special torch chamber 20. The second advantage is that, though the first torch and the second torch generated by the ignition of the lean mixture are comparatively weak, they act to help each other so that, when one torch tends to reduce in the energy level, the other may compensate it.

The above-mentioned sharing serves to prevent an occurrence of surging fluctuation of torque also. In an automobile, if the combustion in its engine does not proceed uniformly, a surging fluctuation of torque will occur to impair the riding comfort. The occurrence of such surging fluctuation of torque can be said of an engine of dual mixture type which is provided with a torch chamber having only one opening. Therefore, it is effective to provide this type with the first and second openings in the same manner as it mentioned above for its torch chamber.

Figure 3:
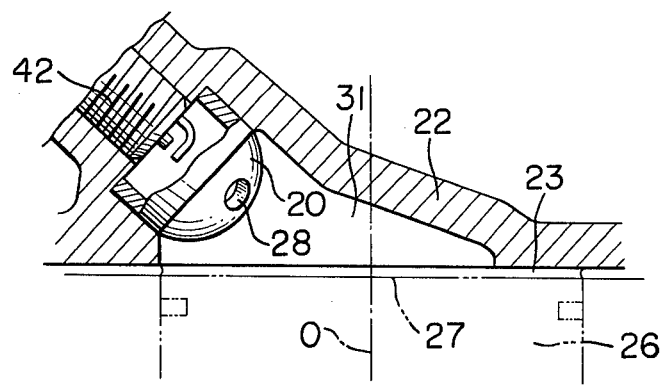
FIG. 3 is a sectional view taken in the direction of line 3—3 in FIG. 2.
Figure 5:
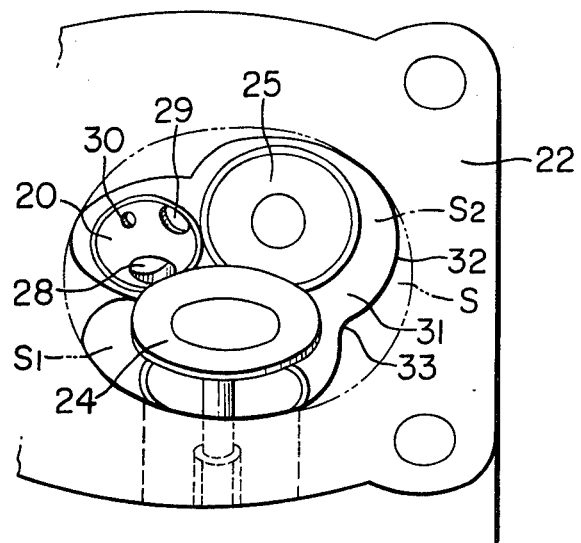
FIG. 5 is a perspective view showing another cylinder head of an engine according to the present invention.
Figure 6:
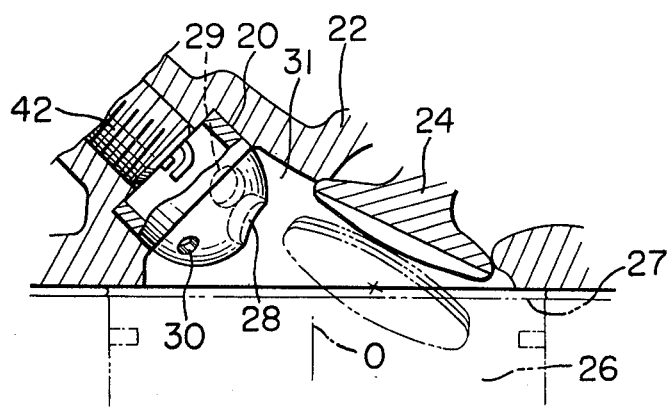
FIG. 6 is an elevational view of the cylinder head shown in FIG. 5 while taking a section through the auxiliary combustion chamber for generating the torch flames and the suction valve.
Figure 8:
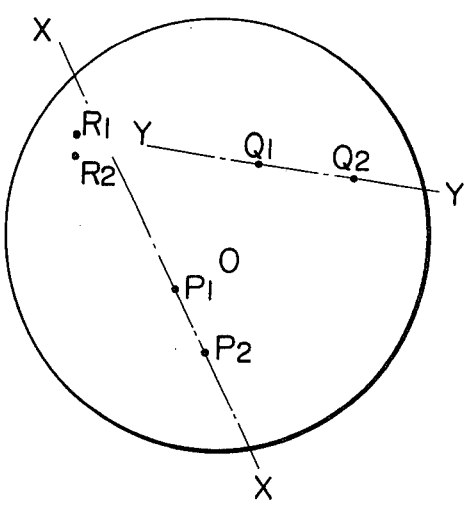
FIG. 8 is a view similar to FIG. 4 about the cylinder head shown in FIGS. 5, 6 and 7.

The torch flames from the first and second openings 28, 29 explained with reference to FIGS. 2 and 3 incline in a large amount to the center line 0 of the cylinder bore and reach the top surface 27 of the piston 26 through the combustion chamber (main combustion chamber) opposing the suction valve 24 and the exhaust valve 25. Therefore, the influence of the first and second torches on the part just below and behind of the torch chamber 20 is or may be somewhat weak. The torch chamber 20 is provided with a third opening 30 for avoiding this as shown in FIGS. 5 to 7. And, the centers of areas on the top surface 27 of the piston against which to the torches blow are shown in FIG. 8. The points $R_1$ and $R_2$ in this figure are of the flow due to a torch emitted from the third opening 30. The cross-sectional area of the third opening 30 is made small considering the position and volume of the space within the combustion chamber shared by it, and the direction of its center line is made nearly parallel with the center line of the cylinder bore. Between the cross-sectional areas $A_1$, $A_2$ and $a$ of the first, second and third openings 28, 29, 30, respectively there is a relation of $A_1 > A_2 > a$. The relation of $A_1 > A_2$ is provided to increase scavenging efficiency of the torch chamber 20. This point will be explained later.

The action of the squishing (turbulence) area 23 is important. This area 23 acts to generate micro-vortexes in the combustion chamber densely during the compression stroke of the piston 26. And, the micro-vortexes generated by the squishing action due to the area 23 increase propagating velocity of flame in the combustion chamber. As explained before, two torches share the parts $S_1$, $S_2$ of the combustion chamber. The combustion of lean mixture in the combustion chamber terminates within a relatively short time due to the above sharing of the parts $S_1$, $S_2$, the generation of the micro-vortex and a flow of combustion-nuclei into the part s of the combustion chamber which will be explained hereafter.

The part s of the combustion chamber is one in which an intense squishing action occur due to the squishing area 23 on the cylinder head 1. It is known that the intensity of this squishing action is maximum near the crank angle of 20° BTDC (before top dead center) and become zero when the piston reaches top dead center. The change of volume of the part s occurs in an opposite direction during the explosion stroke. That is to say, the volume of the part s increases most quickly near the crank angle of 20° ATDC (after top dead center). And, by this quick change of volume a flow of gas occurs so that amounts of the combustion-nuclei in the parts $S_1$, $S_2$ are carried into the part s. Accordingly, the lean mixture in the combustion chamber can be ignited under little delay not only in the parts $S_1$ and $S_2$ but also in the part s.

As before explained, in the case of the cylinder head shown in FIG. 2, a fairly large amount of the turbulance area 9 shown in FIG. 1 is lost, and the remaining area is small. This area, even though it is relatively small, is preferably for the first and second torches, because a flow of mixture due to the squishing action by this area remains to aid in their emission.

Figure 9:
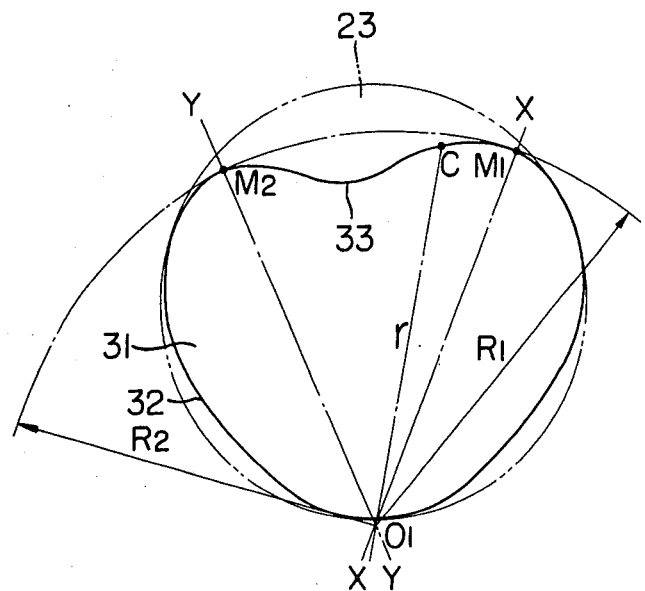
FIGS. 9 and 10 are bottom views explaining squishing (turbulance) areas provided on the cylinder heads.
Figure 10:
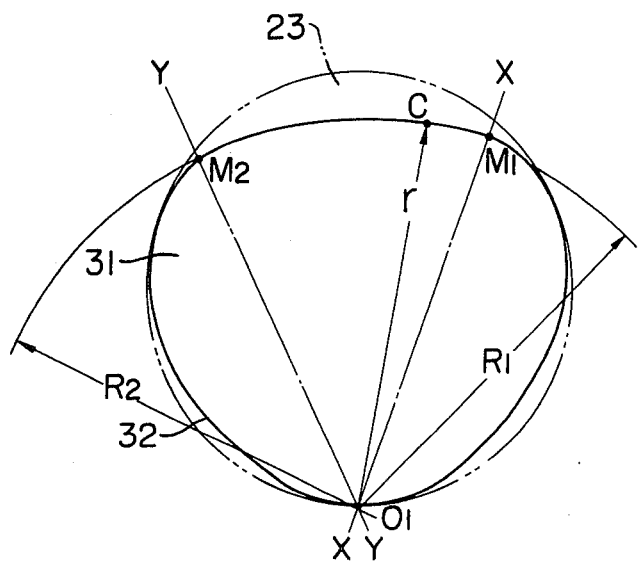
Figure 11:
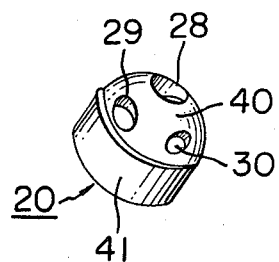
FIGS. 11 and 12 are a perspective view and a plan view, respectively, of the auxiliary combustion chamber shown in FIGS. 5, 6 and 7, respectively.
Figure 12:
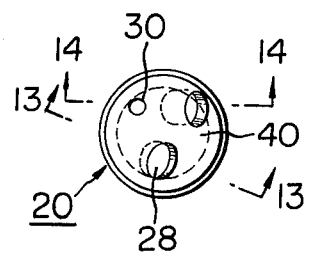

The peripheral outline 32 of the combustion chamber recess in the cylinder head 31 enters between the suction valve 24 and the exhaust valve 25 so that the squishing area 23 can be formed. In regard to the entering amount, there are two cases. One is a case shown in FIG. 9 and the other is a case shown in FIG. 10. The outline shown in FIG. 9 has a contracted narrow part 33 but the outline shown in FIG. 10 has no narrow part. In these figures, the center of the torch chamber 20 is indicated by $O_1$, the distance from the center $O_1$ to a point C on the peripheral outline 32 is indicated by r, the largest maximum value of r is indicated by $R_1$, the maximum value of r is large compared next to the value $R_1$ is indicated by $R_2$, and the cross points between the planes X—X, Y—Y and the peripheral line 32 are respectively shown by $M_1$, $M_2$. The size of the turbulance area 23 shown in FIG. 9 is larger than that which is shown in FIG. 10.

When the lean mixture is fed to the torch chamber, it is necessary to elevate the temperature of the mixture so that ignition by a spark plug surely occurs. In the case of the dual fuel feeding system type in which rich mixture is fed to the torch chamber, it is possible to adjust the final A/F of the mixture in the torch chamber so that the mixture is ignited easily by a spark plug. But, in the case of the engine which is fed with a lean mixture (for example, a lean mixture adjusted to have A/F of 17 to 18) there is not such opportunity. Therefore, the torch chamber should be one which has the ability to elevate the temperature of a lean mixture to an extent wherein an accurate ignition by a spark plug is possible. Further, the scavenging and the bringing up of the flame are important.

The torch chamber 20 is so considered as to well elevate the temperature of the lean mixture and is also considered in the other points described hereafter. The shape of the torch chamber 20 is shown in FIGS. 11 to 14. As shown in these figures, the torch chamber 20 is a thick and cup-shaped piece consisting of a spherical head portion 40 merging into a cylindrical base portion 41. The spherical head portion is made especially thick and the openings 28, 29 and 30 are provided on this portion. The torch chamber 20 is fitted to cylinder head 22 exposing all or the greater part of the head portion 40 in the combustion chamber recess 31.

The following data are mentioned as an example illustrative of an engine according to the present invention:
Displacement volume per one cylinder —300 c.c.
Diameter of bore —75 mm
Volume of the torch chamber —3.5 c.c.
Thickness of the head portion 40 of the torch chamber 20 —about 3.0 mm
Thickness of the cylindrical base portion 41 of the torch chamber 20—about 2.5 mm.

The thickness of the head portion 40 and the thickness of the base portion 41 are made different from each other so that the heat loss through the base portion 41 is decreased and so that a sufficiently large amount of heat is accumulated in the head portion 40 exposed to the combustion chamber. Heat loss can be decreased by provision of a slot or by provision of a heat-insulating layer even when the above thicknesses are equal. Thickness of the head portion 40 concerns areas of side walls of the openings 28, 29 and 30, and by increasing this thickness it is possible to transmit a large amount of heat to the lean mixture when it enters the torch chamber 20. The increasing of the thickness of the head portion 40 brings another advantage in that the directions of torches emitted through the openings 28, 29, 30 can be accurately determined.

A spark plug 42 with a sparking gap 43 is provided in the bottom portion of the torch chamber 20. In relation to the position of the sparking gap 43, the torch chamber 20 is made comparatively shallow, and the relation between the inside diameter D of the base portion 41 and the maximum depth H of the inner space is selected so that D is larger than H, that is to say, an equation $D/H > 1$ is satisfied.

For the ignition of lean mixture by the spark plug, it is important to heat the mixture and to scavenge the torch chamber 20 sufficiently well with the lean mixture which is fed through a suction port. In consideration of this point, among the three openings 28, 29 and 30 one opening 28 is made larger in the cross-sectional area than are the other openings 29 and 30. This opening 28 is positioned adjacent to the suction valve 24, and further, it is positioned to take a direction towards a flow of lean mixture which is introduced into the combustion chamber while being guided by the head of the suction valve 24. In the direction of the opening 28 there is such restriction as is already described with reference to FIGS. 2 to 10. But, there is an allowable range for this restriction. That is to say, the planes X—X and Y—Y can be deviated within a range of ±10° or preferably within a range of ±5°. Further, there is a considerably large space for the fitting of the torch chamber 20. Therefore, it is possible to provide one opening 28 through which there can be introduced a flow of lean mixture for the scavenging. Other openings 29 and 30 are those through which the lean mixture for the scavenging will flow out, and are made in directions not directed to the flow of the lean mixture.

The number of openings explained above is two or three. But those corresponding to the third opening can be made two and the total number of openings can be made four.

There is a proper ratio between the volume of the torch chamber and the total area of the openings. This ratio is considered to be in a range of 0.14 — 0.3 cm²/cc. In a case wherein three openings are provided for the torch chamber, by determining the diameters of the openings to 7 mm, 5.5 mm and 4 mm respectively and further, by determining the above ratio to 0.214, it is possible to obtain an engine wherein a desirable combustion occurs in the combustion chamber.

It is necessary to consider that the main flow of heat from the torch chamber 20 does not pass through the spark plug 42 even through the heat flow from the torch chamber 20 to the cylinder head 22 is suppressed as before explained, as the temperature of the head portion 40 of the torch chamber is particularly high.

The lean limit of the mixture can be known by investigating A/F at which the rate of hydrocarbon emission increases in sizable amount. FIG. 16 is a diagram showing experimental data between the rate of hydrocarbon emission and the A/F relative to four engines. The white circles, the back circles, the white triangle and the black triangles are used as shown in the following table:

Table

| Number and notation | Squishing action | Number of torch-openings | Directions of torch flames |
| --- | --- | --- | --- |

Table -continued

| No. | | | |
|---|---|---|---|
| No. 1 (White circles) | Present (following the present invention) | 3 | Selected as to follow the present invention |
| No. 2 (Black circles) | Present (following the present invention) | 2 | Selected as to follow the present invention |
| No. 3 (White triangles) | Present (similarly with the case of the present invention) | 1 | Does not follow the present invention |
| No. 4 (Black triangles) | absent | 1 | Does not follow the present invention |

No. 1 and No. 2 are cases according to the present invention. It will be found that in each of these cases the lean limit moves toward the higher side of A/F in comparison with the cases of No. 3 and No. 4. Further, it will be seen also that the rate of emission of hydrocarbon in each of the case 1 and case 2 is smaller than those in the cases of No. 3 and No. 4. This shows that the combustion occurs favorably in the case of the engine according to the present invention.

FIG. 17 shows relations between the rate of load fluctuation $\Delta W/W$ and A/F relative to the same cases shown in the above table. In this figure, two curves shown on the lower side are those of the cases according to the present invention, and it will be seen that the rate of load fluctuation is lowered in comparison with the cases of No. 3 and No. 4.

In FIGS. 16 and 17 the values given in abscissa represent "AIR-FUEL RATIO A/F". In FIG. 16, the ordinates represent "RATE OF HYDROCARBON EMISSION (g/h)", while in FIG. 17 the ordinates represent "RATE OF LOAD FLUCTUATION ($\Delta W/W \times 100$)".

We claim:

1. A gasoline engine fed with lead mixture only, said engine having a cylinder, a piston therein and a cylinder head provided with a torch chamber having a spark plug therein for emitting a plurality of flames into the combustion chamber, and a suction valve and an exhaust valve, characterized in that;
   (a) the cylinder head is provided with a combustion chamber recess with a periphery which enters toward the center line of the cylinder in a maximum amount between the suction valve and the exhaust valve to provide an area to create an intense turbulence of a lean mixture in cooperation with the top surface of the piston;
   (b) the torch chamber is located on the cylinder head at a position spaced from the center line of the cylinder; and
   (c) the torch chamber is provided with at least two openings, the center line of one of said openings being directed to pass through a portion of the combustion chamber just below the center of the head of the suction valve, and the center line of the other of said openings being directed to pass through a portion of the combustion chamber just below the center of the exhaust valve; the torch flames emitted from the said two openings being directed toward the top surface of the piston.

2. A gasoline engine according to claim 1 wherein the periphery of the combustion chamber recess enters toward the center line of the cylinder to offer a contracted narrow part.

3. A gasoline engine according to claim 1 wherein the torch chamber has the form of a cup consisting of a spherical head portion merging into a cylindrical base portion, the sparking gap of the spark plug being situated at the bottom of the torch chamber and at least the greater portion of the head portion being exposed in the combustion chamber.

4. A gasoline engine according to claim 3 wherein the ratio of the inside diameter of the cylindrical base portion of the torch chamber to the depth of the torch chamber is more than 1.

5. A gasoline engine according to claim 3 wherein at least a part of the cylindrical base portion of the torch chamber is thinner than the spherical head porton of the torch chamber.

6. A gasoline engine according to claim 1 wherein that opening which is near the suction valve has the largest cross-sectional area of the plurality of openings and is provided to receive a flow of lean mixture which is guided to flow into the combustion chamber by the head of the suction valve, and the other openings in the torch chamber being provided on the side not receiving the flow of lean mixture.

7. A gasoline engine according to claim 1 wherein a third opening smaller than the first and second openings is provided to emit a torch flame extending to the top surface of the piston over substantially the shortest path.

8. A gasoline engine according to claim 1 wherein the ratio of the sum of the cross-sectional areas of the plurality of openings in the torch chamber to the volume of the torch chamber is determined to take a value within a range of 0.14 to 0.3 cm$^2$/cc.

9. A gasoline engine fed with lean mixture only, said engine having a cylinder, a piston therein and a cylinder head provided with a torch chamber having a spark plug therein for emitting a plurality of torch flames into the combustion chamber, and a suction valve and an exhaust valve, characterized in that:
   (a) the cylinder head is provided with a combustion chamber recess with a periphery which enters toward the center line of the cylinder in a maximum amount between the suction valve and the exhaust valve to provide an area to create an intense turbulence of a lean mixture in cooperation with the top surface of the piston;
   (b) the torch chamber is disposed on the cylinder head in a position spaced from the center line of the cylinder; and
   (c) the torch chamber is provided with at least two openings, the center line of one of said openings being directed to pass, within a range of ±10°, by the side of a plane which is parallel with the center line of the cylinder and which includes the center of the head of the suction valve and the center line of the other of the said openings being directed to pass, within a range of ±10°, by the side of a plane which is parallel with the center line of the cylinder and which includes the center of the head of the exhaust valve; the torch flames emitted from said two openings being directed toward the top surface of the piston.

* * * * *